United States Patent
Batra et al.

(10) Patent No.: US 10,437,510 B2
(45) Date of Patent: Oct. 8, 2019

(54) MONITORING STORAGE CLUSTER ELEMENTS

(71) Applicant: NetApp, Inc., Sunnyvale, CA (US)

(72) Inventors: Ankit Batra, Bangalore (IN);
Amarnath Jolad, San Jose, CA (US);
Kazunobu Nishime, Milpitas, CA (US)

(73) Assignee: NetApp Inc., Sunnyvale, CA (US)

( * ) Notice: Subject to any disclaimer, the term of this patent is extended or adjusted under 35 U.S.C. 154(b) by 230 days.

(21) Appl. No.: 14/613,085

(22) Filed: Feb. 3, 2015

(65) Prior Publication Data
US 2016/0224277 A1    Aug. 4, 2016

(51) Int. Cl.
*G06F 3/06*     (2006.01)
*H04L 29/08*    (2006.01)
(Continued)

(52) U.S. Cl.
CPC ............ *G06F 3/0653* (2013.01); *G06F 3/067* (2013.01); *G06F 3/0619* (2013.01);
(Continued)

(58) Field of Classification Search
CPC .... G06F 3/067; G06F 11/1464; G06F 3/0665; G06F 3/0617; G06F 3/0689; G06F 17/30705; G06F 1/3203; G06F 2009/45579; G06F 3/0635; G06F 3/065; G06F 3/0661; G06F 3/0662; G06F 3/0688; G06F 16/182; G06F 16/188; G06F 15/173; G06F 16/2343; G06F 11/3409; G06F 11/3051; G06F 11/3055; G06F 11/328; G06F 11/3495; H04L 41/12; H04L 67/1097; H04L 45/46; H04L 67/1002; H04L 41/0893; H04L 12/2416; H04L 67/1095; H04L 67/12; H04L 67/1023; H04L 47/125; H04L 67/1008; H04L 67/101

See application file for complete search history.

(56) References Cited

U.S. PATENT DOCUMENTS 7,533,169 B1     5/2009   Gold et al.
2002/0083030 A1*  6/2002   Yang ................. G06F 17/30575
(Continued)

FOREIGN PATENT DOCUMENTS

EP           2784677 A1    10/2014

OTHER PUBLICATIONS

Int. Search Report/Written Opinion cited in PCT Application No. PCT/US2016/012980 dated May 4, 2016, 13 pgs.

*Primary Examiner* — Djenane M Bayard
(74) *Attorney, Agent, or Firm* — Cooper Legal Group, LLC

(57) ABSTRACT

Monitoring health of associated, but separated storage clusters can be done at both a node scope and a cluster scope. Monitoring the storage clusters at the cluster scope includes monitoring the network elements that support the storage clusters and connect the storage clusters. Initially, a fabric monitor in each cluster discovers cluster topology. This cluster topology is communicated and maintained throughout the managing storage elements of the storage clusters. After the storage cluster topologies have been discovered, the fabric monitors of each cluster can periodically determine status of network elements of the storage clusters. This allows the storage clusters to maintain awareness of interconnect status, and react to changes in status. In addition, each managing storage element monitors its own health. This information is aggregated to determine when to trigger corrective actions, alerts, and/or storage features in accordance with rules defined at the managing storage elements.

20 Claims, 5 Drawing Sheets

(51) Int. Cl.
    *H04L 12/24*    (2006.01)
    *H04L 12/26*    (2006.01)
(52) U.S. Cl.
    CPC ........ *H04L 41/065* (2013.01); *H04L 41/0893* (2013.01); *H04L 41/12* (2013.01); *H04L 43/0817* (2013.01); *H04L 67/1097* (2013.01)

(56) References Cited

U.S. PATENT DOCUMENTS

| | | | |
|---|---|---|---|
| 2003/0212788 A1* | 11/2003 | Wilding | G06F 11/0715 709/224 |
| 2007/0156733 A1* | 7/2007 | Meyerson | H04L 43/0817 |
| 2008/0215827 A1* | 9/2008 | Pepper | G06F 3/0605 711/154 |
| 2011/0023104 A1* | 1/2011 | Franklin | G06Q 10/025 726/11 |
| 2013/0198346 A1 | 8/2013 | Jubran et al. | |
| 2013/0262643 A1* | 10/2013 | Anderson | G06F 8/60 709/223 |
| 2013/0311989 A1* | 11/2013 | Ota | G06F 9/45558 718/1 |
| 2015/0215059 A1* | 7/2015 | Kerpez | H04M 11/062 379/406.01 |
| 2016/0078220 A1* | 3/2016 | Scharf | G06F 21/51 726/1 |
| 2016/0105350 A1* | 4/2016 | Greifeneder | H04L 41/046 709/224 |

* cited by examiner

MONITORING STORAGE CLUSTER ELEMENTS

BACKGROUND

Aspects of the disclosure generally relate to the field of distributed computing, and, more particularly, to monitoring storage elements distributed across a network.

Clustering generally refers to grouping hardware elements together to reap the benefit of the group ("cluster") of hardware elements (e.g., disk drives, storage arrays, file servers, storage controllers, etc.) that cannot be gained from individual hardware elements. Clustering can be used for various storage features, examples of which include load balancing, failover support, increasing I/O bandwidth, and data availability. To support these features, data is copied between the supporting storage elements.

SUMMARY

Monitoring health of associated, but separated storage clusters can be done at both a node scope and a cluster scope. Monitoring the storage clusters at the cluster scope includes monitoring the network elements that support the storage clusters and connect the storage clusters. Initially, a fabric monitor in each cluster discovers cluster topology. This cluster topology is communicated and maintained throughout the managing storage elements of the storage clusters. After the storage cluster topologies have been discovered, the fabric monitors of each cluster can periodically determine status of network elements of the storage clusters. This allows the storage clusters to maintain awareness of interconnect status, and react to changes in status. In addition, each managing storage element monitors its own health. This information is aggregated to determine when to trigger corrective actions, alerts, and/or storage features in accordance with rules defined at the managing storage elements.

BRIEF DESCRIPTION OF THE DRAWINGS

The disclosed examples may be better understood by referencing the accompanying drawings.

DETAILED DESCRIPTION OF ILLUSTRATIONS

Figure 1:
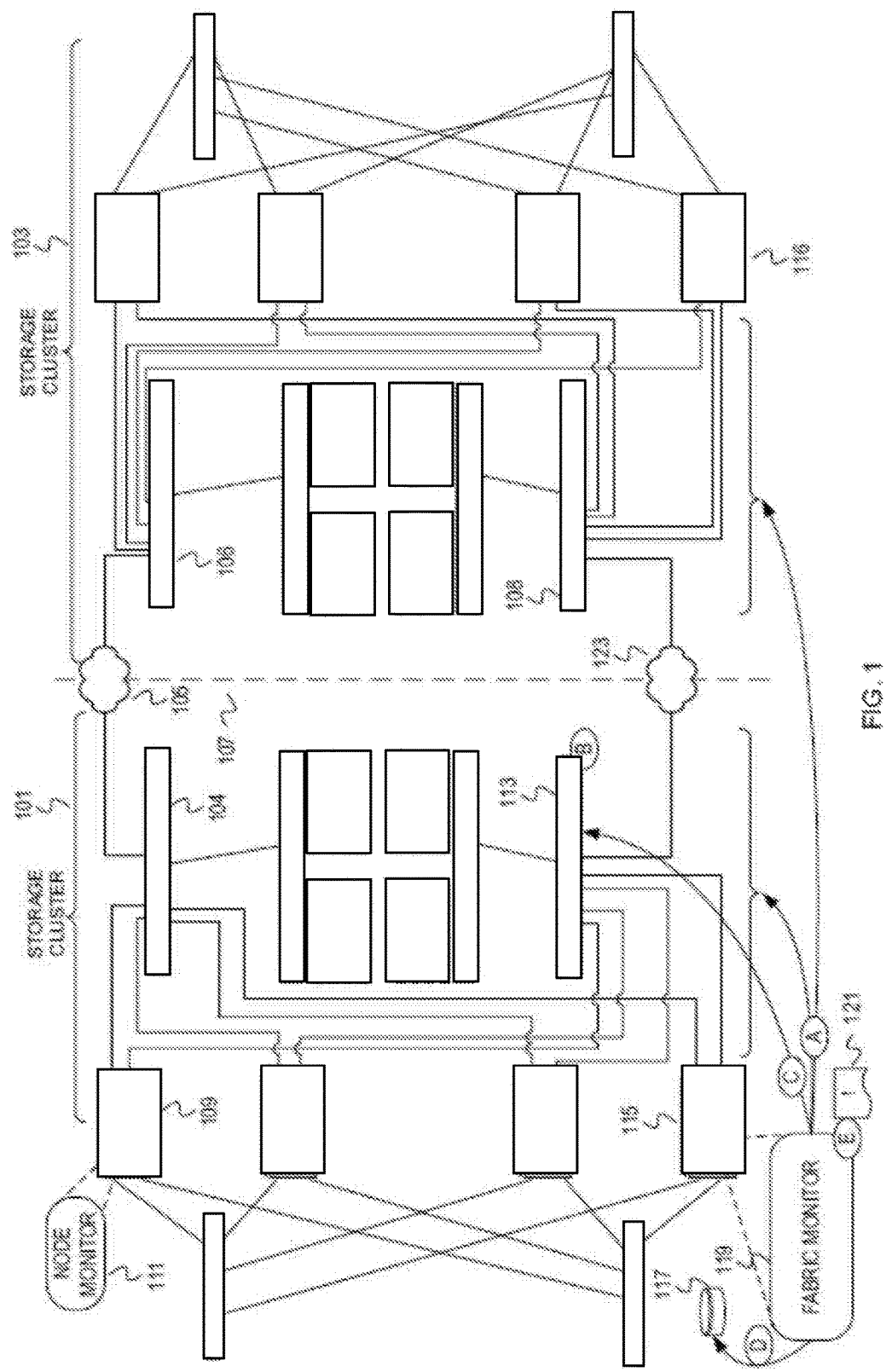
FIG. 1 depicts two example storage clusters with health monitors to monitor health of the storage clusters.

The description that follows includes example systems, methods, techniques, instruction sequences and computer program products that embody techniques of the disclosure. However, it is understood that the described aspects may be practiced without these specific details. For instance, although examples refer to a storage cluster fabric, aspects can be applied to other backend connectivity configurations. In other instances, well-known instruction instances, protocols, structures and techniques have not been shown in detail in order not to obfuscate the description.

Terminology

This description uses the term "storage element" to refer to any entity within a storage system that hosts and/or manages access to data. Storage elements referred to herein can be categorized as managing storage elements and hosting storage elements. The distinction between a managing storage element and a hosting storage element arises from the primary functionality of the storage element. Managing storage elements primarily manage access to hosting storage elements. Managing storage elements process requests from other devices (e.g., clients) and can originate requests to perform operations (e.g., snapshot operations). Regardless of whether the request is from another device or originates from the managing storage element, the managing storage element transmits a request to a hosting storage element. Examples of a managing storage element include a file server and a storage controller. A hosting storage element primarily performs operations that ultimately fulfill requests from the perspective of the managing storage element. A hosting storage element performs a read of or a write to a location specified by a request from a managing storage element. This read or write may be performed on a disk or multiple disks. In the case of multiple layers of virtualization, the read or write may be performed on what appears to be a disk or disks from the perspective of the managing storage element. Examples of a hosting storage element include a disk drive, an optical drive, a storage array, and a tape drive.

The terms managing storage element and hosting storage element are used based on the primary functionality of a storage element because functionality is not exclusive between the elements. For instance, a storage controller may have data locally stored in cache to expedite handling of access requests. Even though the storage controller can fulfill access requests, the primary functionality of the storage controller is not to read data from and write data to local memory. Similarly, a hosting storage element can include hardware that manages access to disks. For instance, a redundant array of independent disks (RAID) controller and an array of disks can be housed within a single enclosure. Although the RAID controller manages access to the array of disks, the primary functionality of the components housed within that single enclosure is to fulfill requests received from a managing storage element.

This description uses the terms "out-of-band" and "in-band." These terms correspond to different communication channels. An in-band communication, for instance, refers to a communication that is communicated over a communication channel being primarily used for data exchange, management, etc. for a storage cluster. An out-of-band communication refers to a message that is communicated over a communication channel that is not being primarily used for data exchange and/or management, although it can be used to a significantly lesser degree for these purposes than the in-band communication channel. These communication channels can be physically distinct (e.g., different cables, different interfaces, etc.) and/or can be different communication protocols.

This description also uses the term "network element." The term network element refers to a device that directs communications, which can include data and access requests, through a network. A network element can be a router, a switch, a bridge, etc.

Introduction

A cluster of storage elements ("storage cluster") can be associated with another storage cluster across multiple networks and/or interconnected via long-haul connections (e.g., over thousands of kilometers). The storage clusters are associated with each other to support some of the previously mentioned storage features. Data can be mirrored between storage clusters and synchronized between storage clusters for data availability, failover, disaster recovery, etc. Associating clusters separated by large distances decreases susceptibility to location based disasters and allows for increased data availability.

Some of the storage features supported across clusters (e.g., failover, mirroring, etc.) use information about storage cluster elements. This information can include configuration information, environmental information, and statistics. This information is referred to herein as "health information" because it can be indicative of "health" (i.e., operational integrity) of the storage clusters. Monitoring health of associated, but separated storage clusters can be done at both a node scope and a cluster scope. Monitoring the storage clusters at the cluster scope includes monitoring the network elements that support the storage clusters and connect the storage clusters. Initially, a fabric monitor in each cluster discovers cluster topology. This cluster topology is communicated and maintained throughout the managing storage elements of the storage clusters. After the storage cluster topologies have been discovered, the fabric monitors of each cluster can periodically determine status of network elements of the storage clusters. This allows the storage clusters to maintain awareness of interconnect status, and react to changes in status. In addition, each managing storage element monitors its own health. This information is aggregated to determine when to trigger corrective actions, alerts, and/or storage features in accordance with rules defined at the managing storage elements.

Illustrations

FIG. 1 depicts two example storage clusters with health monitors to monitor health of the storage clusters. A first storage cluster 101 and a second storage cluster 103 are depicted with a same configuration. A dashed line 107 depicts separation of the storage clusters 101, 103. Each storage cluster includes a group of interconnected managing storage elements ("frontend") and a storage backend. The example storage backend configuration depicted in FIG. 1 for each storage cluster includes four storage element groups (e.g., storage arrays or storage stacks), two bridges that bridge the network of the managing storage elements and the network of the storage elements (e.g., bridging Fibre Channel to Small Computer System Interface (SCSI)), and two switches. Each switch of a storage cluster connects to a peer switch in the other storage cluster across a long haul depicted as network clouds. The switch 104 of the storage cluster 101 connects to the switch 106 of the storage cluster 103 via a long haul network 105. The switch 113 of the storage cluster 101 connects to the switch 108 of the storage cluster 103 via a long haul network 123. Of course, other configurations are possible.

As mentioned, each of the storage clusters 101, 103 also includes four storage management elements. The storage cluster 101 includes managing storage elements 109, 115. The storage cluster 103 includes a managing storage element 116. The other managing storage elements of the storage clusters 101, 103 are not identified individually for this illustration. The managing storage element 109 hosts a node monitor 111. Although not labeled, all of the managing storage elements in the storage clusters 101, 103 host node monitors. The node monitors monitor health of the subsystems of the managing storage elements. Thus, the node monitor 111 monitors the health of the subsystems of the managing storage element 109. The managing storage element 115 hosts a fabric monitor 119 in addition to a node monitor. The fabric monitor 119 monitors health of the network elements of the backend fabric in both storage clusters 101, 103. The managing storage element 116 also hosts both a fabric monitor and a node monitor. The fabric monitor running on the managing storage element 116 also monitors health of the backend fabrics in both storage clusters 101, 103. As depicted, a single fabric monitor is instantiated in each storage cluster. The operations of the fabric monitor on the managing storage element 116 are not depicted since they are similar to those of the fabric monitor 119.

A series of stages A-E are depicted in FIG. 1 as an example illustration of the fabric monitor 119 reacting to a particular issue in the backend fabric. These are example stages used to help illustrate functionality of the fabric monitor. These stages are not to be used to limit scope of the claims.

At stage A, the fabric monitor discovers topology of both storage clusters 101, 103. As ports are connected, the fabric monitor begins to sends requests for information to network elements connected to the managing storage element 115. These requests for information propagate throughout the fabric through the network elements connected directly to the managing storage element. In addition to topology, the fabric monitor 119 requests health information from the switches and the bridges of the storage clusters 101, 103. The fabric monitor 119 can request information about power subsystems, environmental information, configuration information, etc. For example, the fabric monitor 119 can send out Simple Network Management Protocol (SNMP) messages with management information bases (MIBs) that define objects corresponding to the requested information. The use of SNMP messages allows the fabric monitor 119 to begin collecting information from the network elements prior to completion of the storage cluster (e.g., prior to a fibre channel adapter being installed on the managing storage element 115 to connect to the other managing storage elements). After discovering topology, the managing storage element 115 shares the topology information with the other managing storage element of the storage cluster 101. Likewise, the managing storage element 116 will discover topology of both storage clusters and share that information with the managing storage elements of storage cluster 103. After cluster topology is established, the fabric monitor 119 periodically queries the network elements in the storage clusters 101, 103 for health information.

At a stage B, health information of the switch 113 changes. Examples of changes in health information include a change in virtual storage area network (VSAN) configuration and a change in temperature.

At a stage C, the fabric monitor 119 queries the switch 113 during one of its periodic monitoring requests. The fabric monitor 119 collects the information including a change in VSAN configuration and temperature of the switch 113.

At a stage D, the fabric monitor 119 updates a database 117 with the collected information. The database 117 is maintained and synchronized across managing storage elements of both storage clusters 101, 103. When the database 117 is updated, the fabric monitor 119 applies rules to at least the updated entries in the database 117. For example, the rules may indicate that a notification should be generated if temperature of the switch 113 exceeds a defined temperature threshold and that a notification should be generated if a port of the switch 113 is not configured for a particular VSAN.

At a stage E, the fabric monitor 119 applies rules to the database 117 and determines that an alert notification is to be generated. The fabric monitor 119 generates the notification and passes it to another module of the managing storage element 115. For instance, the fabric monitor 119 generates a notification to a user interface of the managing storage element 115 that the temperature of the switch 113 has exceeded a temperature warning threshold. Based on the notification, the system or an administrator can take a corrective action or initiate a corrective plan of action (e.g., reducing load on the switch 113).

Figure 2:
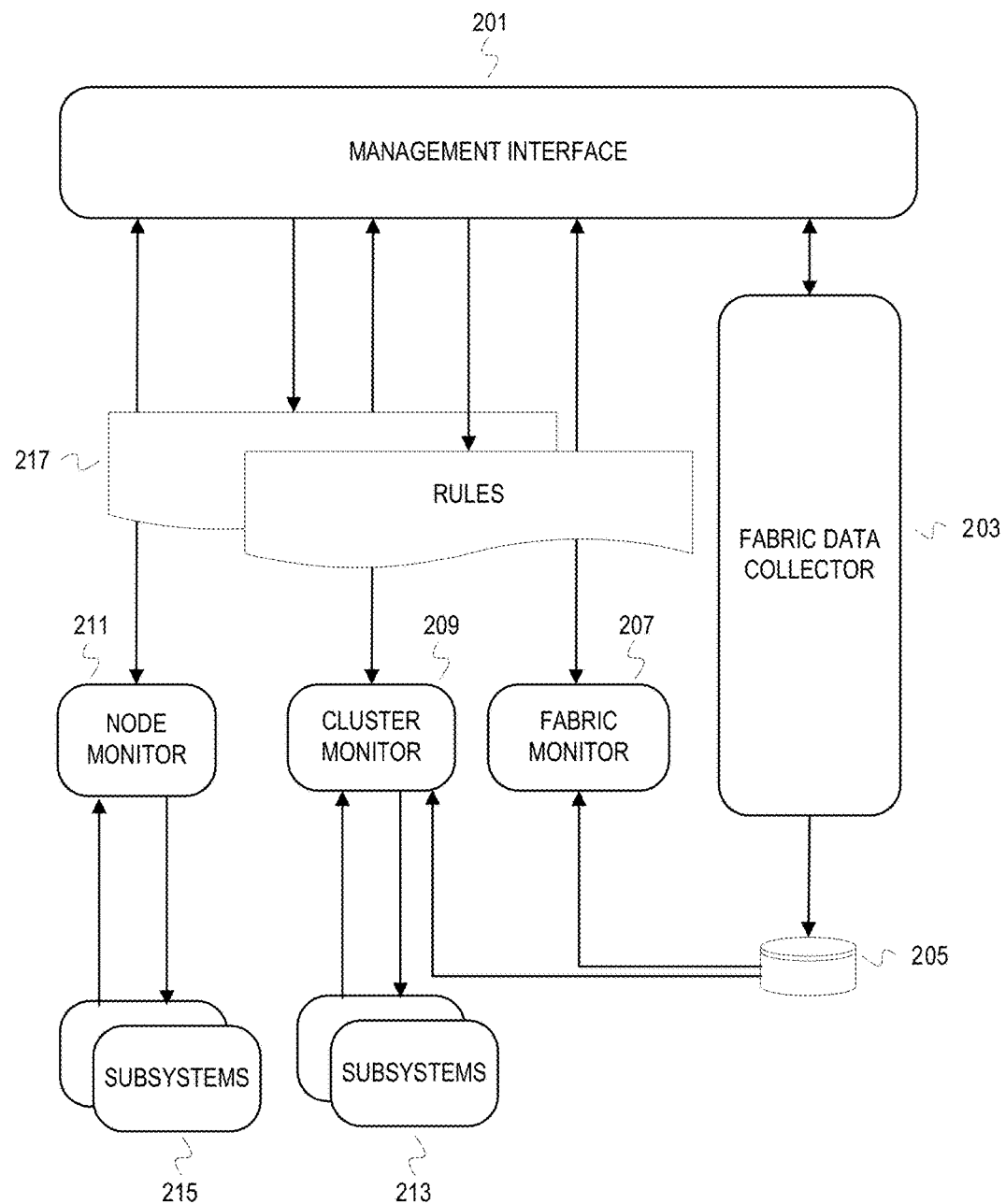
FIG. 2 depicts an example set of modules to implement monitoring of a storage cluster.

FIG. 2 depicts an example set of modules to implement monitoring of a storage cluster. FIG. 2 depicts a fabric data collector 203, a fabric monitor 207, a cluster monitor 209, and a node monitor 211. All of these modules can be configured through a management interface 201. The fabric data collector 203, the fabric monitor 207, the cluster monitor 209, and the node monitor 211 can also generate notifications and present the notifications to the management interface 201. FIG. 2 also depicts subsystems 213, 215. The node monitor 211 interacts with the subsystems 215 and the cluster monitor 209 interacts with the subsystems 213.

The fabric data collector 203 collects data about the backend fabric of a storage cluster and an associated storage cluster. The fabric data collector 203 can run as a background process, a job (i.e., series of programs), etc. The fabric data collector 203 discovers network elements connected to interfaces of a device ("node") that hosts the fabric data collector 203. The fabric data collector 203 also discovers network elements further removed from the hosting node (e.g., network elements up to n links away). The fabric data collector 203 can discover network elements that are not directly connected to the hosting node by querying the devices that are directly connected to the hosting node or analyzing the information collected from those network elements. For instance, the fabric data collector 203 can analyze forwarding tables collected from network elements. The fabric data collector 203 updates the cluster database 205 with the information collected from the network elements. This information indicates the cluster topology and health information of the network elements. As previously mentioned in FIG. 1, the cluster database 205 is communicated among all of the managing storage elements of a storage cluster.

The fabric monitor 207 monitors health of the storage cluster fabric using the cluster database 205 and the fabric data collector 203. The fabric monitor 207 causes the fabric data collector 203 to periodically collect health information from network elements of the fabric. The fabric monitor 207 can install rules from the rules 217 or references to rules into the cluster database 205. When the fabric data collector 203 updates the cluster database 205, the installed rules are invoked to ensure the update does not violate any conditions of the rules. For instance, the fabric data collector 203 evaluates rules as part of updating the cluster database 205. The fabric monitor 207 can also register interest in the cluster database 205 and receive a notification or interrupt when an update is made. The fabric monitor 207 can then apply rules from the rules 217 to the updated entries of the cluster database 205. If a rule condition is violated (e.g., failed switch power supply, port misconfiguration, etc.), then the fabric monitor 207 can generate a notification for the management interface 201. However, policies can be defined that require a certain number of violations and/or combination of violations before a notification is generated. Accordingly, the fabric monitor 207 can maintain a history of violations to determine when to generate a notification or alert.

The cluster monitor 209 can also register interest in the cluster database and/or install rules from the rules 217 into the cluster database 205. The cluster monitor 209 validates topology of the storage cluster via the fabric data collector 203 and the cluster database 205. The cluster monitor 209 conveys topology rules to the fabric data collector 203 to ensure there are no violations either in set-up of a storage cluster (e.g., single switch fabric) or in a deployed storage cluster (e.g., loss of a managing storage element). The cluster monitor 209 also interacts with the subsystems 213 to determine other rule violations. Examples of the subsystems 213 include an interconnect subsystem and a networking subsystem. The networking subsystem can embody implementations of network protocols, management of structures for networking (e.g., logical interfaces, sockets, etc.), networking features (e.g., failover operations), etc. The cluster monitor 209 can periodically interface (e.g., with an application programming interface (API)) with either of the subsystems 213. With the example of the interconnect subsystem, the cluster monitor 209 can periodically call functions to determine state of connections (e.g., protocol connections, port statistics, etc.) with other managing storage elements and with the backend storage. With the example of the networking subsystem, the cluster monitor 209 can periodically call functions to determine state of logical interfaces that are configured for inter-cluster connections. The cluster monitor 209 also scans managing storage elements in its storage cluster. The cluster monitor 209 can scan the managing storage elements to verify connection, configuration (e.g., instantiated objects for inter-cluster connections), etc. As with the fabric monitor, the cluster monitor 209 can generate notifications depending upon the rules and policies that specify when notifications are to be generated. However, policies can be defined that require a certain number of violations, combination of violations, and/or time aggregation before a notification is generated. Accordingly, the cluster monitor 209 can maintain a history of violations to determine when to generate a notification or alert.

The node monitor 211 monitors health of the hosting node. To do this, the node monitor 211 interacts with the systems 215. Examples of the subsystems include a storage subsystem, power subsystem, and an interconnect subsystem. The node monitor 211 can interact with the subsystems 215 with APIs or can register with the subsystem processes to receive notifications of particular events (e.g., failed fan, critical temperature, power loss, failed port, etc.). In some cases, events can be generated from the subsystems 215 that suggest a problem in the cluster and not the node itself. For instance, the subsystems 215 can generate an event that indicates failure of an inter-cluster interface. The node monitor 211 applies a rule to the event that indicates the failure as a possible "back-hoe" event. A back-hoe event involves a complete loss of connectivity with a site, system, cluster, region, etc., depending on the scale of the event and/or impacted network relationship. This event is associated with a back-hoe because a common cause for loss of connectivity is an actual back-hoe severing a cable. But a back-hoe event can be other events (e.g., natural disasters). The rule for the possible back-hoe event can define an action for the node monitor 211 to notify the cluster monitor 209. In response, the cluster monitor 209 can perform a series of operations to determine whether a back-hoe event has occurred. The cluster monitor 209, for instance, can cause all managing storage elements of the storage cluster to ping all partnered managing storage elements in an associated storage cluster (e.g., a disaster recovery peer storage cluster).

Rapid detection of a back-hoe event allows for a rapid response to the back-hoe event. When a back-hoe event is suspected, the fabric monitor 209 can trigger the fabric data collector 203 to send out-of-band messages (e.g., SNMP requests) to the network elements of the associated storage cluster. In addition, the cluster monitor 209 can cause the managing storage elements of the storage cluster to check for heartbeats. As an example, heartbeats can be implemented as remote direct memory access reads of a heartbeat counter on managing storage elements in the associated storage cluster via fiber channel virtual interfaces.

The illustrated individual modules are constructions based on functionality to aid in understanding the functionality. FIG. 2 should not be used to narrow claim scope to particular modules or program organization. For instance, a single module could be implemented or depicted to encompass the illustrated functionality of the fabric monitor 207 and the fabric data collector 209. In addition, implementations will vary by different platform. As one example, monitoring implementation can vary between a multi-threaded single core processor and a multi-processor node.

Although the preceding examples refer to the storage cluster fabric, the scope of the claims is not so limited. It may be typical for a storage cluster to be configured with a fabric (i.e., full connectivity between managing storage elements), but that connectivity configuration is not required. The below examples will refer more generally to storage cluster network instead of a fabric. The below examples are flowcharts of example operations that are independent of the particular module separation depicted in FIG. 2.

Figure 3:
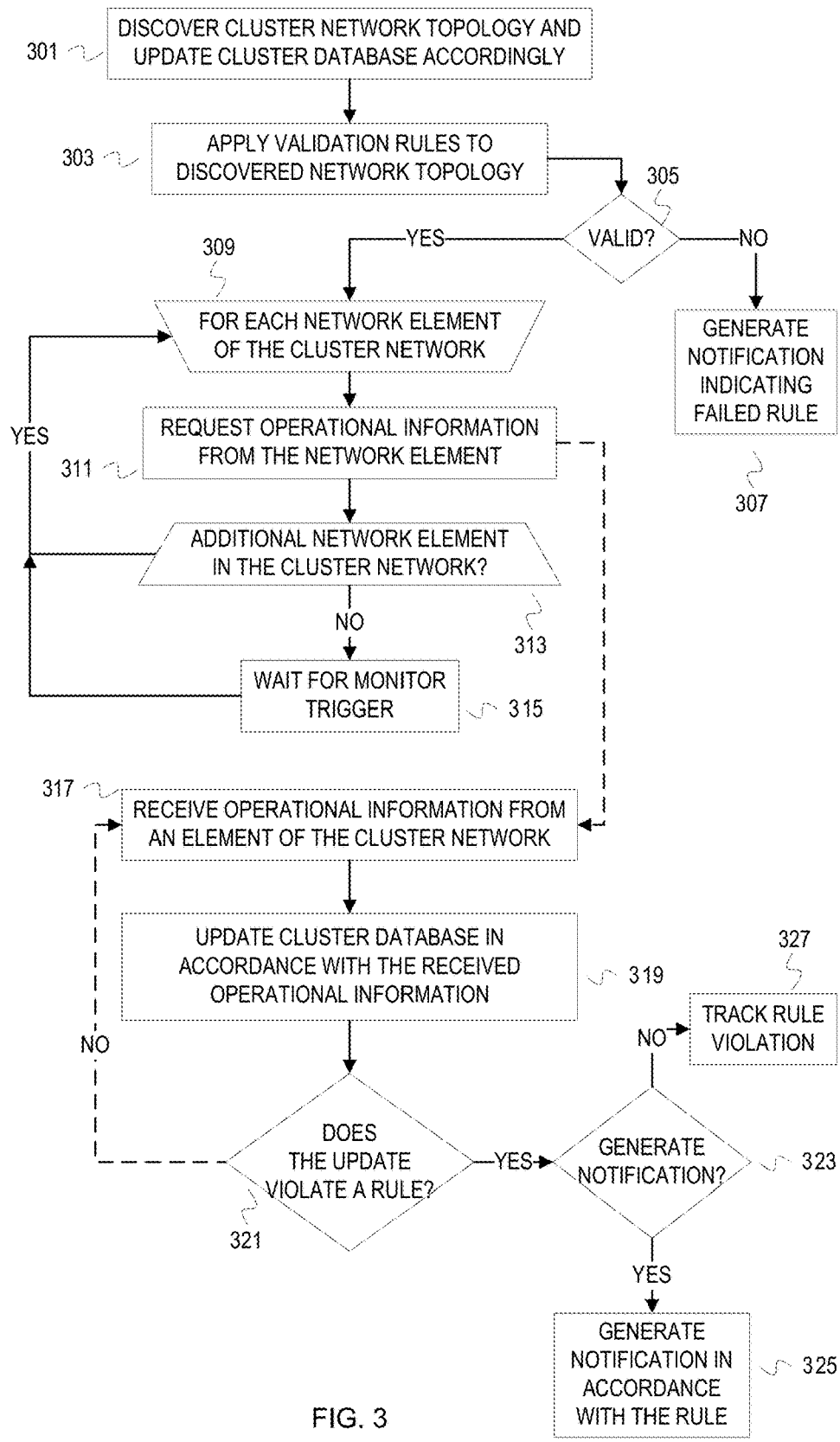
FIG. 3 depicts a flowchart of example operations for monitoring a storage cluster network and an associated storage cluster network.

FIG. 3 depicts a flowchart of example operations for monitoring a storage cluster network and an associated storage cluster network. Dashed lines between blocks indicate that operational flow is not directly sequential, and can indicate waiting for a response or an interrupt. The figure also refers to cluster for storage cluster. The operations are described with reference to a node, which is a managing storage element, in the storage cluster performing the operations.

At block 301, a node discovers network topology of its storage cluster, and updates a cluster database accordingly. As connections are established, the node sends out communications to discover elements in the backend. The backend elements can include both storage elements and network elements, as well as other managing storage elements. The node is connected to the backend with different interfaces/ports/cards than the other managing storage elements. The node can use any combination of physical interfaces, logical interfaces, worldwide names, and network addresses to determine the storage cluster topology. The node can discover topology with both out-of-band and in-band communications. For example, the node can send out SNMP messages to network elements out-of-band (e.g., other than Fibre Channel). The node can initially discover topology with out-of-band communications in a first time period, for example while the storage cluster is being established and/or cluster relationships are being configured. Afterwards, updates of the collected topology information can be done based on in-band communications. This second or subsequent time period can persist until a defined event occurs, e.g., disruption or change in cluster relationship. In addition, a node can transition between in-band and out-of-band communications for collecting operational information and/or topology information at defined intervals. The defined intervals can be dependent upon occurrence of an event or independent of an event. For example, a node can use out-of-band communications until notified that in-band communications have been established. After notification of a possible back-hoe event, the node can alternate between in-band and out-of-band communications for defined time periods until resolution of the possible back-hoe event. The node updates the cluster database with the information either received or retrieved from the members of the storage cluster. The node also discovers topology of an associated storage cluster (e.g., a storage cluster with a mirroring or disaster recovery relationship). The node determines interfaces configured for inter-cluster connections. For example, logical interfaces can be defined on managing storage elements to connect to managing storage elements of an associated cluster through specified network elements.

At block 303, the node applies validation rules to the discovered network topology. After at least some of the cluster storage topology is discovered, topology validation rules can be applied to the information to determine whether the discovered topology is compliant with specifications represented by the validation rules. For instance, the topology validation rules can require a certain number of switches, redundant paths between associated storage cluster, a certain number of managing storage elements, etc.

At block 305, the node determines whether the discovered cluster storage topology is valid in accordance with the topology validation rules applied at block 303. If the discovered topology is valid, then control flows to block 309. If not, then control flows to block 307. At block 307, the node generates a notification that the discovered network topology violates the validation rules. The notification can indicate the topology rule that was violated (e.g., minimum of two switches in the backend fabric).

At block 309, repeating operations begin for each network element of the storage cluster network. The example repeating operation is represented by block 311.

At block 311, the node requests operational information ("health information") from a discovered network element of the storage cluster. Examples of the operational information include environmental information (e.g., current temperature, manufacturer's recommended operating temperature), configuration information (e.g., VSAN configuration, protocol configurations, etc.), subsystem information (e.g., power supply information, fan information), and operating statistics (e.g., throughput, dropped packets, load per connection, etc.). The node can send a series of requests that target each information source (e.g., operating system, protocol module, etc.) of the network element. For instance, the node can send requests for information about configuration before sending a separate request for operating statistics. The node can send a single request that indicates all operational information is requested. The format of the messages will be agreed upon in advance. In some cases, the node may configure the network elements before requesting operational information. As an example, the node may notify the network element of the reporting protocol and specification of messages. The node may install code that supports the reporting protocol and message specifications. After the initial collection of operational information, the node may request only subsets of the operational information in subsequent requests.

At block 313, the node determines whether there are additional discovered network elements from which operational information is to be obtained. If there are no more within this time window, then control flows to block 315. If there are additional discovered network elements to query, then control flows to block 309.

At block 315, the node waits for a monitor trigger. A monitor trigger may be the expiration of a time period. The node can be configured to collect operational information from cluster members, including backend network elements, at predefined time periods. A monitor trigger can also be an event driven or interrupt driven trigger. For instance, an event in a node subsystem can cause the node to request global or particular operational information from all or specified cluster members prior to expiration of a time period. After the monitor trigger, control flows back to block 309.

At block 317, the node receives operational information from an element of the storage cluster network. A dashed line from block 311 to block 317 indicates the node receives operational information. The operational information can be received at any time after the request at block 311 and before any timeout mechanism that may be implemented. Thus, the sequence between blocks 311 and 317 is not necessarily sequential. In other words, the node may be receiving operational information from element X after requesting operational information from elements X, Y, and Z.

At block 319, the node updates a cluster database in accordance with the received operational information. The node does not necessarily write all operational information received from an element. The node may only write a subset of the received operational information. In some cases, the node may not write anything into the cluster database. For instance, the operational information may indicate that the responding element has an operational fan and is operating at an acceptable temperature. In that case, the node may not update the cluster database with anything other than an indication that the element responded.

At block 321, the node determines whether the received operational information violates a rule. Conceptually, a rule may be that the transmit power of a switch must not exceed a defined threshold. In program code, the rule would be expressed as a condition, e.g., is the transmit power of a switch above a defined threshold. Thus, violation of a rule would be satisfaction of a condition that expresses the rule in program code. The rule can also indicate or be associated/reference an action to take when the rule is violated. If operating voltage of a network element exceeds a threshold, then generate an alert notification to the management interface, as an example. The node can access a set of rules by indexing into the rules with a parameter that represents the operational information (e.g., switch voltage). As another example, entries of the cluster database can be associated with rules. The rules can be referenced or literally embedded into the cluster database. When an entry is updated, the corresponding rule(s) is evaluated to determine whether it is violated. If a rule is violated, then control flows to block 323. Otherwise, control flows back to block 317 when the node receives operational information again.

At block 323, the node determines whether to generate a notification. Although a rule may be violated, a policy may be defined to aggregate violations in numbers or over time, depending upon the rule. For instance, a policy may condition generation of a notification on repeat violations of a warning level for an operating temperature rule within a specified time period. In contrast, the node may generate a notification in response to a single violation of the critical temperature level. If a notification is to be generated, then control flows to block 325. At block 325, the node generates a notification in accordance with the rule. The rule may specify that an alert be produced in a user interface or that an error log be updated.

At block 327, the node tracks the rule violation. The node tracks the rule violation in case an aggregation of violations will trigger notification generation. Rule violations can be tracked even if a notification was generated. Different notifications may be generated for multiple violations of a same rule. In addition, a rule can specify whether tracking should be performed.

In addition to tracking rule violations, a node can track events that violate rules in combination of other events or in accumulation. Although FIG. 2 referred primarily to interacting with subsystems with APIs, implementations can use any combination of message passing, event generation, and APIs for monitoring.

Figure 4:
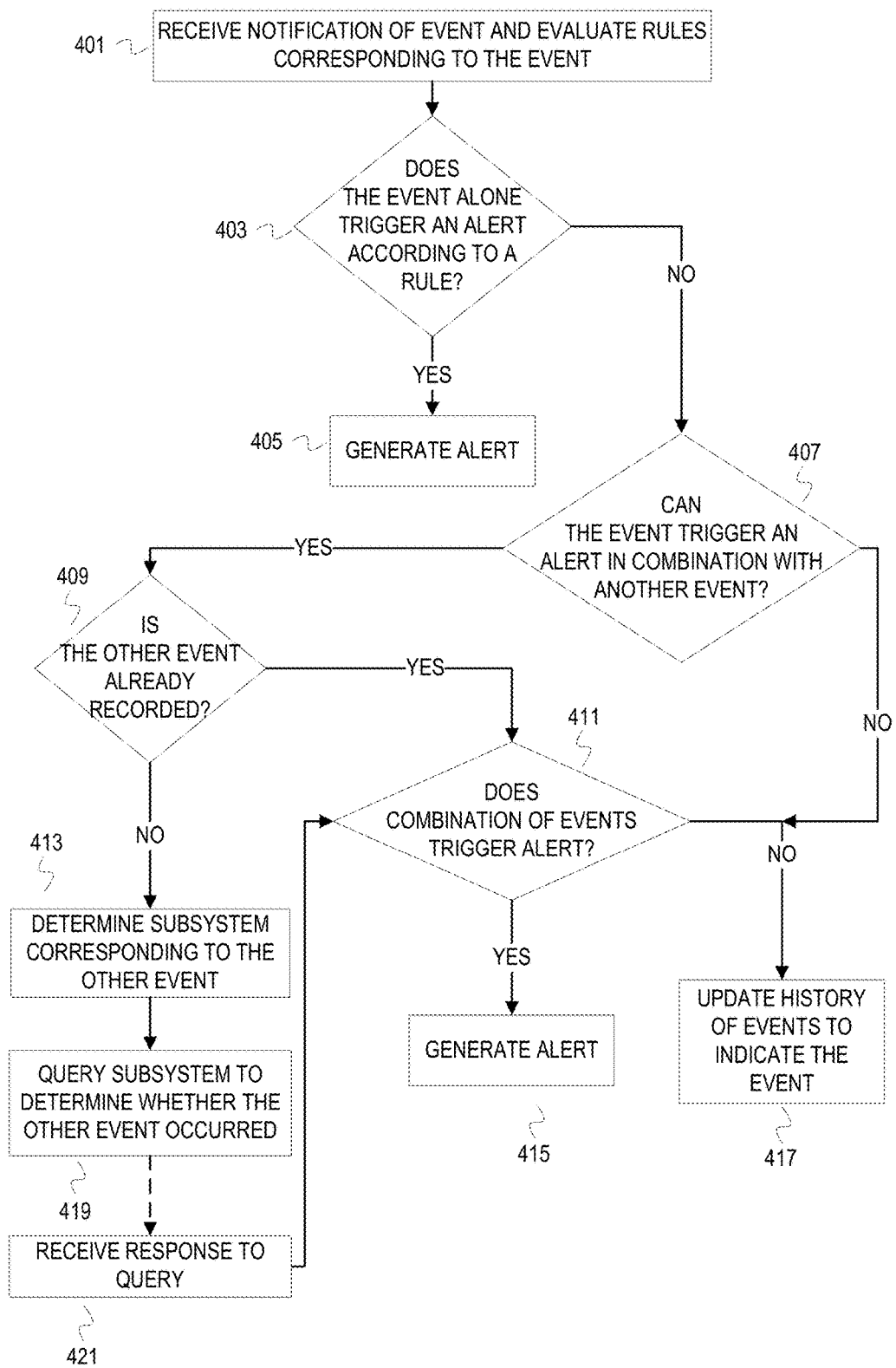
FIG. 4 depicts a flowchart of example operations for monitoring events and event history.

FIG. 4 depicts a flowchart of example operations for monitoring events and event history. The operations of FIG. 4 are described with reference to a node in a storage cluster as with FIG. 3.

At block 401, the node receives notification of an event and evaluates a rule(s) corresponding to the event. A monitoring process on the node registers with another process of the node to receive notifications of events. The monitoring process can specify the types of events, a particular subsystem, a combination of subsystem and types of events, etc. The monitoring process can register with a process of a subsystem or register with a centralized process of the node's operating system, for example. The node determines a rule that corresponds to the event based on the content of the event notification and the originating subsystem. A set of rules can be defined for each subsystem. For instance, a set of rules can be defined for an interconnect subsystem. The rules can include statistics based rules, connection time rules, logical interface rules, etc.

At block 403, the node determines whether the event alone triggers an alert notification according to the evaluated rule. If it does, then the node generates the alert notification at block 405. The alert notification can be generated for presentation via a user interface, messaging, or be communication between processes of the node. If the event alone does not trigger an alert notification, then control flows to block 407.

At block 407, the node determines whether the event can trigger an alert notification in combination with another event. The other event may be a different event that occurs within a given time period, or the other event may be a previous occurrence(s) of the event. If the event can trigger an alert notification in combination with another event, then control flows to block 409. Otherwise, control flows to block 417.

At block 409, the node determines whether the other event has already been recorded (i.e., has already occurred). If so, then control flows to block 411. If not, then control flows to block 413. As an example of an event that combines with other events, would be failure of a logical interface configured for inter-cluster connection. If other nodes have connections to the associated storage cluster, then the failure of the logical interface is likely local. A rule can specify that when a failure of a logical interface is detected, then the node is to communicate that failure to the node currently monitoring the storage cluster. If the node is the node monitoring the storage cluster, then the rule can specify that the node is to request the other nodes to ping their counterparts in the associated storage cluster.

At block 413, the node determines a subsystem corresponding to the other event. As an example, the event may be a temperature that exceeds the warning threshold but has not exceeded the critical temperature threshold. A rule can specify that the node should determine fan status from the cooling subsystem. In some cases, the subsystem may be on a different node. For instance, a cluster monitor node would determine that it will contact the other nodes of the storage cluster.

At block 419, the node queries the subsystem to determine whether the other event occurred. If the rule indicated that the node should query the cooling subsystem, the node queries the cooling subsystem for fan status. If the rule indicated that the node (operating as cluster monitor) was to query connection status of the other nodes, then the node instructs the other nodes to ping their counterparts in the associated storage cluster and requests a response based on the results.

At block 421, the node receives a response to the query. After receiving the response, control flows to block 411.

At block 411, the node determines whether the combination of events triggers an alert notification. If the combination of events triggers an alert notification, then control flows to block 415, where the node generates an alert notification. Otherwise, control flows to block 417. At block 417, the node updates history of events to indicate the event.

The flowcharts are provided to aid in understanding the illustrations and are not to be used to limit scope of the claims. The flowcharts depict example operations that can vary among aspects of the disclosure. Additional operations may be performed; fewer operations may be performed; the operations may be performed in parallel; and the operations may be performed in a different order. For example, the operations depicted in blocks 301 and 303 may overlap. After a time period or configured number of cluster members are discovered, a node can begin to apply topology rules and continue applying those rules are more of the storage cluster is discovered. As another example, FIG. 3 appears to depict a loop of operations that includes blocks 309, 311, and 313. Aspects are not required to execute a loop, and allow for interruption of the operations, as well as variance from an iterating sequence. Referring to FIG. 4, a node can update event history depending upon the result of the combination event rule evaluation.

As will be appreciated by one skilled in the art, aspects of the disclosure may be embodied as a system, method or program code/instructions stored in one or more machine-readable media. Accordingly, aspects may take the form of hardware, an software (including firmware, resident software, micro-code, etc.) or a combination of software and hardware that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone computer, may execute in a distributed manner across multiple computers, and may execute on one computer while providing results and or accepting input on another computer.

Examples are described with reference to flowchart illustrations and/or block diagrams of methods, apparatus (systems) and program code according to aspects of the disclosure. It will be understood that each block of the flowchart illustrations and/or block diagrams, and combinations of blocks in the flowchart illustrations and/or block diagrams, can be implemented by program instructions. These program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These program instructions may also be stored in a machine readable medium that can direct a computer, other programmable data processing apparatus, or other devices to function in a particular manner, such that the instructions stored in the machine readable medium produce an article of manufacture including instructions which implement the function/act specified in the flowchart and/or block diagram block or blocks.

The program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
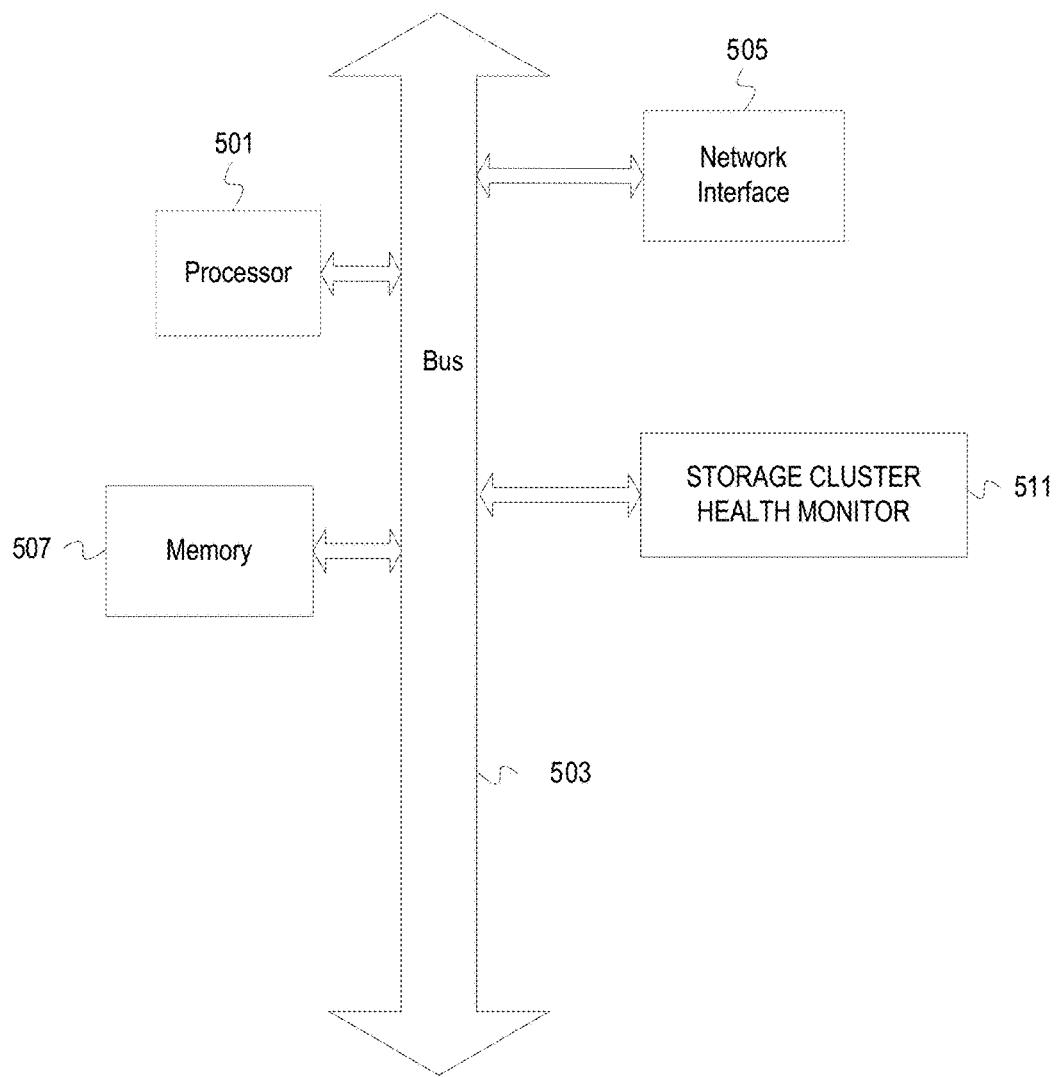
FIG. 5 depicts an example system with a storage cluster health monitor.

FIG. 5 depicts an example system with a storage cluster health monitor. A system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, Hyper-Transport® bus, InfiniBand® bus, NuBus, etc.), a network interface 505 (e.g., an Fiber Channel, an Ethernet interface, an internet small computer system interface, interface, SONET interface, wireless interface, etc.), and a storage device(s) 509 (e.g., optical storage, magnetic storage, etc.). The system also includes a storage cluster health monitor 511. The storage cluster health monitor 511 monitors health of managing storage elements of a storage cluster, backend elements of a storage cluster, and elements of an associated storage cluster. Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

While the disclosure is described with reference to various implementations and exploitations, it will be understood that the descriptions are illustrative and that the scope of the claims is not limited to them. In general, techniques for monitoring health of a storage cluster and associated storage cluster as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the claims. In general, structures and functionality presented as separate components in the example configurations may be implemented as a combined structure or component. Similarly, structures and functionality presented as a single component may be implemented as separate components. These and other variations, modifications, additions, and improvements may fall within the scope of the claims.

What is claimed is:

1. A method comprising:
monitoring clusters using rules within a synchronized database to determine whether conditions of the rules are violated by operational information of devices within the clusters, wherein a policy specifies that a notification is to be generated when a combination of a first rule being violated a first threshold number of times and a second rule being violated a second threshold number of times occurs within a threshold timespan;
performing a database update to the database using the operational information to trigger execution of the rules to evaluate the operational information against the conditions;
tracking a number of times each rule is violated; and
generating and sending the notification over a network to a computing device based upon the first rule being violated the first threshold number of times and the second rule being violated the second threshold number of times within the threshold timespan.

2. The method of claim 1, comprising:
transmitting the notification as a computer interrupt to the computing device based upon the computing device having a registered interest in an operational aspect of the clusters.

3. The method of claim 1, wherein the first rule is violated when a number of redundant paths to storage is below a threshold subsystem.

4. The method of claim 1, comprising:
performing in-band communication with a first storage cluster upon completion of a cluster establishment and cluster relationship configuration phase, wherein the in-band communication occurs over a communication channel used for data exchange.

5. The method of claim 4, comprising:
transitioning between out-of-band communication and in-band communication with the first storage cluster according to defined intervals.

6. The method of claim 4, comprising:
alternating between out-of-band communication and in-band communication with the first storage cluster during a back-hoe event until the back-hoe event is resolved.

7. The method of claim 1, wherein the first rule is violated if a logical interface fails.

8. The method of claim 1, wherein a format of the notification is agreed upon between the computing device and a device performing the monitoring.

9. A non-transitory machine readable medium comprising instructions for performing a method, which when executed by a machine, causes the machine to:
monitor clusters using rules within a synchronized database to determine whether conditions of the rules are violated by operational information of devices within the clusters, wherein a policy specifies that a notification is to be generated when a combination of a first rule being violated a first threshold number of times and a second rule being violated a second threshold number of times occurs within a threshold timespan;
perform a database update to the database using the operational information to trigger execution of the rules to evaluate the operational information against the conditions;
track number of times each rule is violated; and
generate and send the notification over a network to a computing device based upon the first rule being violated the first threshold number of times and the second rule being violated the second threshold number of times within the threshold timespan.

10. The non-transitory machine readable medium of claim 9, wherein the first rule is violated if a switch is not configured for a designated virtual storage area network (VSAN).

11. The non-transitory machine readable medium of claim 9, wherein the instructions cause the machine to:
    utilize an application programming interface (API) to access a computer subsystem for retrieving the operational information.

12. The non-transitory machine readable medium of claim 9, wherein the instructions cause the machine to:
    perform in-band communication with a first storage cluster upon completion of a cluster establishment and cluster relationship configuration phase, wherein the in-band communication occurs over a communication channel used for data exchange.

13. The non-transitory machine readable medium of claim 12, wherein the instructions cause the machine to:
    transition between out-of-band communication and in-band communication with the first storage cluster according to defined intervals.

14. The non-transitory machine readable medium of claim 12, wherein the instructions cause the machine to:
    alternate between out-of-band communication and in-band communication with the first storage cluster during a back-hoe event until the back-hoe event is resolved.

15. The non-transitory machine readable medium of claim 9, wherein the first rule is violated based upon a number of managing storage elements being below a threshold.

16. The non-transitory machine readable medium of claim 9, wherein the first rule is violated based upon a number of switches being below a threshold.

17. A computing device comprising:
    a memory containing machine readable medium comprising machine executable code having stored thereon instructions for performing a method; and
    a processor coupled to the memory, the processor configured to execute the machine executable code to cause the processor to:
        monitor clusters using rules within a synchronized database to determine whether conditions of the rules are violated by operational information of devices within the clusters, wherein a policy specifies that a notification is to be generated when a combination of a first rule being violated a first threshold number of times and a second rule being violated a second threshold number of times occurs within a threshold timespan;
        perform a database update to the database using the operational information to trigger execution of the rules to evaluate the operational information against the conditions;
        track number of times each rule is violated; and
        generate and send the notification over a network to a second computing device based upon the first rule being violated the first threshold number of times and the second rule being violated the second threshold number of times within the threshold timespan.

18. The computing device of claim 17, wherein the machine executable code causes the processor to:
    transmit the notification as a computer interrupt to the second computing device based upon the second computing device having a registered interest in an operational aspect of the clusters.

19. The computing device of claim 17, wherein the machine executable code causes the processor to:
    utilize an application programming interface (API) to access a computer subsystem for retrieving the operational information.

20. The computing device of claim 17, wherein the machine executable code causes the processor to:
    perform in-band communication with a first storage cluster upon completion of a cluster establishment and cluster relationship configuration phase, wherein the in-band communication occurs over a communication channel used for data exchange.

* * * * *